(12) United States Patent
Amigasaya et al.

(10) Patent No.: US 8,947,036 B2
(45) Date of Patent: Feb. 3, 2015

(54) PARALLEL DRIVE SYSTEM

(75) Inventors: Shigeo Amigasaya, Chiyoda-ku (JP);
Hiroyuki Sekiguchi, Chiyoda-ku (JP);
Hidetoshi Ikeda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 200 days.

(21) Appl. No.: 13/579,237

(22) PCT Filed: Feb. 17, 2010

(86) PCT No.: PCT/JP2010/000997
§ 371 (c)(1),
(2), (4) Date: Aug. 15, 2012

(87) PCT Pub. No.: WO2011/101897
PCT Pub. Date: Aug. 25, 2011

(65) Prior Publication Data
US 2012/0299524 A1  Nov. 29, 2012

(51) Int. Cl.
*G05B 11/32* (2006.01)
*G05B 19/23* (2006.01)

(52) U.S. Cl.
CPC .... G05B 19/237 (2013.01); *G05B 2219/50228* (2013.01)
USPC .................. 318/625; 318/400.33; 318/400.34

(58) Field of Classification Search
USPC ............... 318/625, 400.33, 400.34, 611, 637, 318/466, 568.16, 400.32; 701/29; 700/280
See application file for complete search history.

(56) References Cited

U.S. PATENT DOCUMENTS

| | | | |
|---|---|---|---|
| 4,507,598 A | 3/1985 | Onodera et al. | |
| 7,348,745 B2 | 3/2008 | Okita et al. | |
| 2006/0158143 A1 | 7/2006 | Okita et al. | |
| 2012/0227491 A1* | 9/2012 | Yamaoka | 73/504.12 |

FOREIGN PATENT DOCUMENTS

| | | |
|---|---|---|
| CN | 1807013 A | 7/2006 |
| EP | 1 684 139 A1 | 12/2006 |

(Continued)

OTHER PUBLICATIONS

Korean Office Action (Notice of Preliminary Rejection), dated Nov. 26, 2013, 10-2012-7018897.

(Continued)

*Primary Examiner* — Karen Masih
(74) *Attorney, Agent, or Firm* — Sughrue Mion, PLLC; Richard C. Turner (57) ABSTRACT

To provide a parallel drive system that can reduce vibrations of an arm member and can realize positioning at a high speed even when a slave servomotor does not have a position detector, at a low cost. To achieve this object, a parallel drive system of the invention includes: a master servomotor and a slave servomotor that include linearly-moving movable units that are arranged in parallel to each other, respectively; and an arm member that forms a bridge between the two movable units. The system includes: a position detector detecting position information on the movable unit of the master servomotor; an acceleration sensor detecting acceleration information on the movable unit of the slave servomotor; a master servo amplifier controlling the master servomotor based on the position information; and a slave servo amplifier controlling the slave servomotor based on the position information and the acceleration information.

5 Claims, 5 Drawing Sheets

(56) References Cited

FOREIGN PATENT DOCUMENTS

| EP | 1 684 139 B1 | 12/2006 |
|---|---|---|
| JP | 2003-140751 A | 5/2003 |
| JP | 2004-092859 A | 3/2004 |
| JP | 2006-202019 A | 8/2006 |
| JP | 2010-038896 A | 2/2010 |
| TW | 200729673 | 2/2010 |

OTHER PUBLICATIONS

International Preliminary Report on Patentability dated Sep. 18, 2012 issued in International Application No. PCT/JP2010/000997 Corresponds with JP Office Action.

Japanese Office Action dated May 21, 2013 issued in Japanese Application No. 2012-500380.

Taiwanese Office Action dated Jan. 8, 2013 issued in Patent Application No. 099111363.

Office Action mailed in Korean Patent Application No. 10-2012-7018897 mailed on May 20, 2014 English Translation.

Office Action mailed in Chinese Patent Application No. 201080064029.6 mailed Mar. 10, 2014 English Translation.

Communication dated Sep. 16, 2014 from the State Intellectual Property Office of the People's Republic of China in counterpart application No. 201080064029.6.

\* cited by examiner

PARALLEL DRIVE SYSTEM

CROSS REFERENCE TO RELATED APPLICATIONS

This application is a National Stage of International Application No. PCT/JP2010/000997 filed Feb. 17, 2010, the contents of all of which are incorporated herein by reference in their entirety.

FIELD

The present invention relates to a parallel drive system, and more particularly to a parallel drive system that includes two servo actuators that are master and slave servo actuators including linearly-moving movable units arranged in parallel, and an arm member that connects the movable units of the actuators to each other.

BACKGROUND

As a conventional system for parallelly driving an arm member by two actuators, there are a system that includes a position detector in each of master and slave actuators, and a system that does not include a position detector in one of the actuators.

Figure 9:
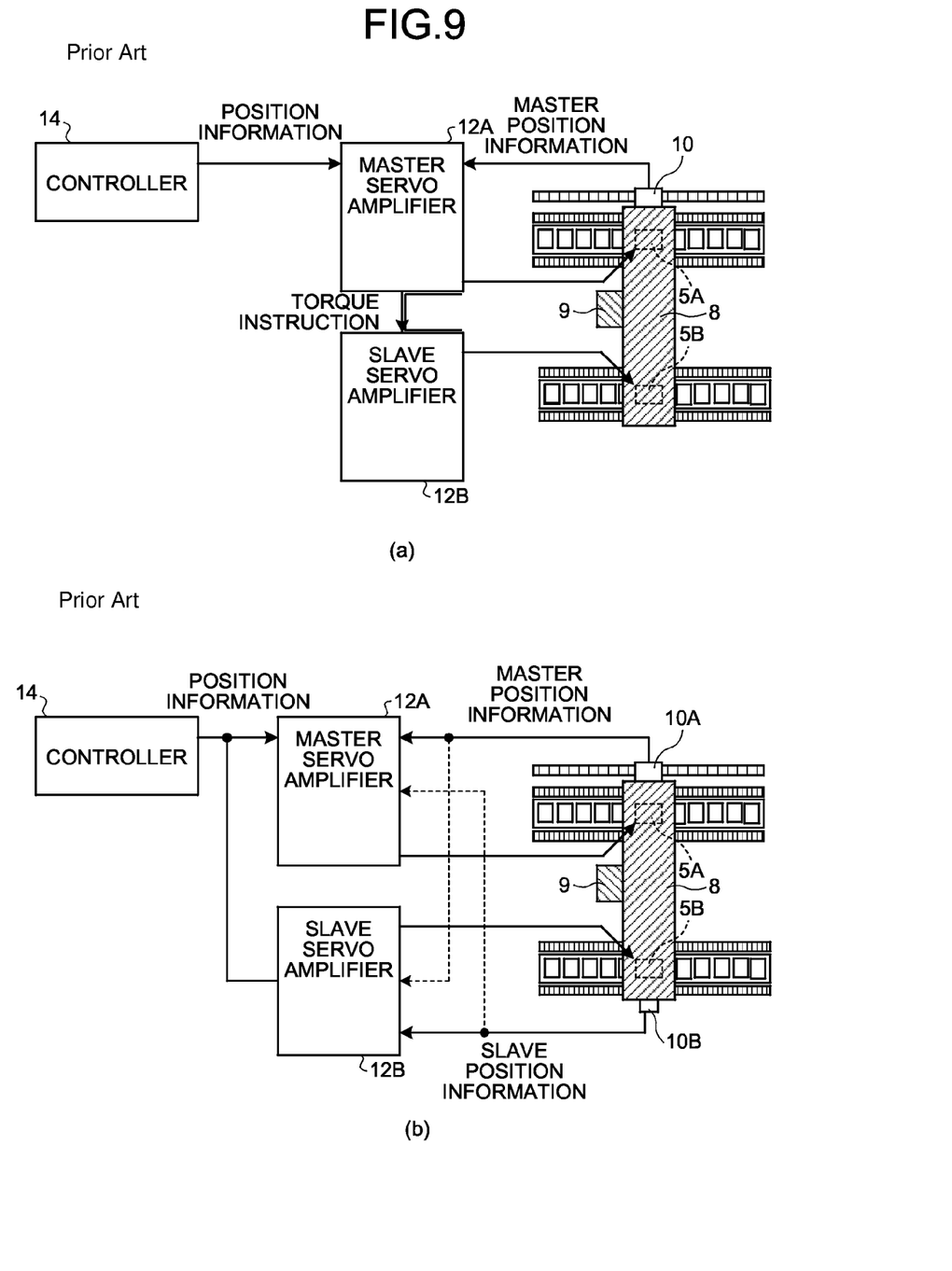
FIG. 9 is an explanatory diagram of a conventional parallel drive system.

FIG. 9 shows an example of a conventional parallel drive system. FIG. 9(a) is a configuration diagram of a parallel drive system that includes a position detector only in a master actuator. In FIG. 9(a), movable units 5A and 5B of respective master and slave actuators are connected to each other by an arm member 8 that includes a head 9. A master servo amplifier 12A executes position control based on a position instruction received from a controller 14 and on master position information that is inputted thereto from a position detector 10 and indicates a position of the movable unit 5A of the master actuator. The master servo amplifier 12A transmits a torque instruction to a slave servo amplifier 12B, and the slave servo amplifier 12B executes torque control using the torque instruction, thus establishing the parallel drive system (see, for example, Patent Literature 1).

FIG. 9(b) is a diagram showing another conventional parallel drive system. In FIG. 9(b), master and slave actuators include their respective position detectors 10A and 10B. The master and slave servo amplifiers 12A and 12B execute position control based on a position instruction received from the controller 14 and position information that is inputted from the position detectors 10A and 10B and indicates positions of the movable units 5A and 5B. Furthermore, in the system shown in FIG. 9(b), position information pieces obtained by the position detectors 10A and 10B are also inputted to the slave and master servo amplifiers 12B and 12A, respectively, as represented by broken-line arrows, thereby to share the position information pieces between the amplifiers 12A and 12B. By executing control to suppress a difference in a position deviation between the movable units of the actuators, or control to move the positions of the movable units of the master and slave movable units more synchronously with each other in the servo amplifier, the parallel drive system that can maintain the parallelism of the arm member is established (see, for example, Patent Literature 2).

CITATION LIST

Patent Literatures

Patent Literature 1: Japanese Patent Application Laid-open No. 2003-140751
Patent Literature 2: Japanese Patent Application Laid-open No. 2004-92859

SUMMARY

Technical Problem

The conventional parallel drive system shown in FIG. 9(a) can be configured while suppressing the cost to be low because the slave actuator is not equipped with a position detector. However, an accuracy of parallel displacement of the arm member 8 degrades when a position of the center of gravity of the arm member 8 deviates from a center of the arm member 8 or when a position of the head 9 of the arm member 8 moves in a direction orthogonal to a driving direction for the arm member 8 because the same torque instruction as that transmitted to the master actuator is transmitted to the slave actuator. In this case, there have been not only a problem that highly accurate positioning is difficult to perform but also a problem that since mechanical load on the arm member 8 increases, it becomes difficult to move the arm member 8 at a high speed.

On the other hand, in the conventional parallel drive system shown in FIG. 9(b), the master and slave actuators are equipped with the position detectors 10A and 10B, respectively, and the master and slave servo amplifiers 12A and 12B execute the position control, respectively. Therefore, it is possible to position the arm member 8 with high speed and high accuracy. Furthermore, by configuring the parallel drive system to share the position information pieces between the master and slave actuators as represented by the broken-line arrows, control to suppress a difference between the actual positions of the movable units 5A and 5B can be performed, and therefore it is possible to parallelly displace the arm member 8 with higher accuracy. However, the conventional system has a problem of high cost because the master and slave actuators have the position detectors 10A and 10B, respectively. When linear scales are used as the position detectors, the cost of the linear scales generally increases in proportion to the size of the device, so that the situation becomes more problematic.

The present invention has been achieved to solve the above problems, and an object to the invention is to realize a parallel drive system that includes two servo actuators that are master and slave servo actuators including linearly-moving movable units arranged in parallel, respectively, and an arm member that connects the movable units of the actuators to each other, whereby the system cost can be held down and high-speed positioning can be achieved.

Solution to Problem

A parallel drive system of the present invention comprising: a first actuator and a second actuator that include linearly-moving movable units that are arranged in parallel to each other, respectively; and an arm member that forms a bridge between the movable unit of the first actuator and the movable unit of the second actuator, wherein the parallel drive system further comprises: a position detection unit that detects position information on the movable unit of the first actuator; an acceleration detection unit that detects acceleration information on the movable unit of the second actuator; a first control unit that controls the first actuator based on the position information; and a second control unit that controls the second actuator based on the position information and the acceleration information.

One aspect of the invention is the parallel drive system, characterized in that the actuators are linear servomotors, the control devices are servo amplifiers, and the position detection unit is a linear scale.

An aspect of the invention is the parallel drive system, wherein the second control unit includes a first speed conversion unit that converts the position information into first speed information, a second speed conversion unit that converts the acceleration information into second speed information, and a speed synthesizer that synthesizes the first speed information and the second speed information into a synthesized speed.

An aspect of the invention is the parallel drive system, wherein the speed synthesizer includes a subtraction unit that subtracts the second speed information from the first speed information, a low-pass filter that has a predetermined cutoff frequency, and receives an output from the subtraction unit, and an addition unit that adds an output from the low-pass filter to the second speed information to generate the synthesized speed.

An aspect of the invention is the parallel drive system, wherein the speed synthesizer includes a low-pass filter that has a predetermined cutoff frequency, and receives the first speed information, a high-pass filter that has a predetermined cutoff frequency, and receives the second speed information, and an addition unit that adds an output from the low-pass filter to an output from the high-pass filter to generate the synthesized speed.

An aspect of the invention is the parallel drive system, wherein the second control unit is configured to: further receive a control signal for controlling a torque of the first actuator from the first control unit; have a torque calculation unit that calculates a corrected torque based on the position information and the acceleration information; and control the second control unit controls the second actuator based on an output from the torque calculation unit and the control signal.

Advantageous Effects of Invention

According to the present invention, it is possible to establish a system at a low cost because a slave servomotor does not have a position detector. It is also possible for the slave servomotor to execute position control because the position information obtained by the position detector of the master servomotor is inputted to both the master and slave servo amplifiers. Furthermore, it is possible to position an arm member at a high speed because the slave servo amplifier is equipped with a speed synthesizer part that synthesizes converted speed information pieces on the respective movable units of the master and slave servomotors into a speed information piece on the slave.

DESCRIPTION OF EMBODIMENTS

The present invention is specifically explained below with reference to the drawings that depict embodiments of the invention. In the following embodiments, a parallel drive system according to the present invention is described while referring to the case where the parallel drive system is a servo system in which linear servomotors are used for actuators including linearly-moving movable units arranged in parallel, respectively, as an example.

First Embodiment

Figure 1:
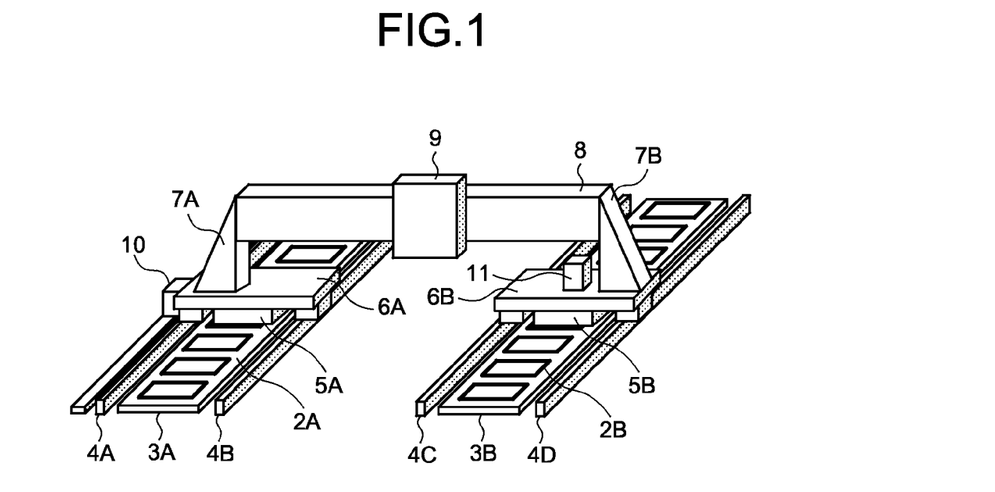
FIG. 1 is a perspective view of mechanical drive units of a parallel drive system according to a first embodiment of the present invention.
Figure 2:
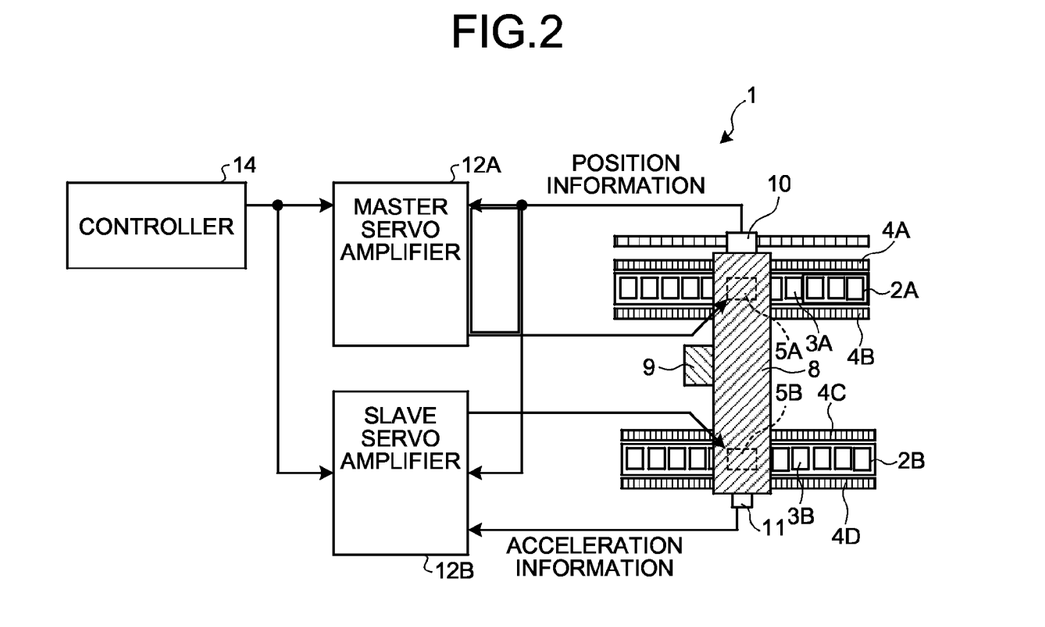
FIG. 2 is a configuration diagram of the parallel drive system according to the first embodiment of the present invention.

A configuration of a parallel drive system according to a first embodiment of the present invention is explained first with reference to the drawings. FIG. 1 is a perspective view showing mechanical drive units of a parallel drive system 1 according to the present invention. FIG. 2 is a configuration diagram of the parallel drive system 1 according to the first embodiment. Symbol A represents a master-side constituent element and symbol B represents a slave-side constituent element. In a master servomotor 2A that is a first actuator and a slave servomotor 2B that is a second actuator, a master fixing unit 3A and a slave fixing unit 3B are arranged in parallel and fixed to a table (not shown) or the like. Linear guides 4A, 4B, 4C and 4D are linear guide members, and movable units 5A and 5B of the servomotors that are arranged to face the fixing units 3A and 3B, respectively, linearly move, that is, make linear motions along these linear guides 4A to 4D.

Table members 6A and 6B are provided to the movable units 5A and 5B on sides of the movable units 5A and 5B opposite to a side facing the fixing units 3A and 3B, respectively. Arm support members 7A and 7B are mounted on the table members 6A and 6B, respectively, and an arm member 8 forms a bridge between the arm support members 7A and 7B. The arm member 8 is driven to move in parallel by driving the movable units 5A and 5B of the servomotors. The head 9 is provided on the arm member 8.

The position detector 10 that is a position detection unit is provided on the master table member 6A. In the present embodiment, description is given assuming that the position detector 10 is a linear scale. An acceleration sensor 11 that is an acceleration detection unit is provided on the slave table member 6B. That is, in the present embodiment, as shown in FIGS. 1 and 2, the slave servomotor 2B is provided with the acceleration sensor 11 instead of a linear scale. Generally, the acceleration sensor 11 is lower in price than the linear scale. Therefore, according to the first embodiment, it is possible to establish the parallel drive system lower in cost than a conventional parallel drive system that includes the linear scales in both of the master and slave actuators as the position detectors 10, respectively.

Position information obtained from the position detector 10 is fed back to both the master servo amplifier 12A that is a first control unit and the slave servo amplifier 12B that is a second control unit. For this reason, the slave servo amplifier 12B can execute not only torque control but also position control. On the other hand, acceleration information obtained from the acceleration sensor 11 is fed back to the slave servo amplifier 12B.

Figure 3:
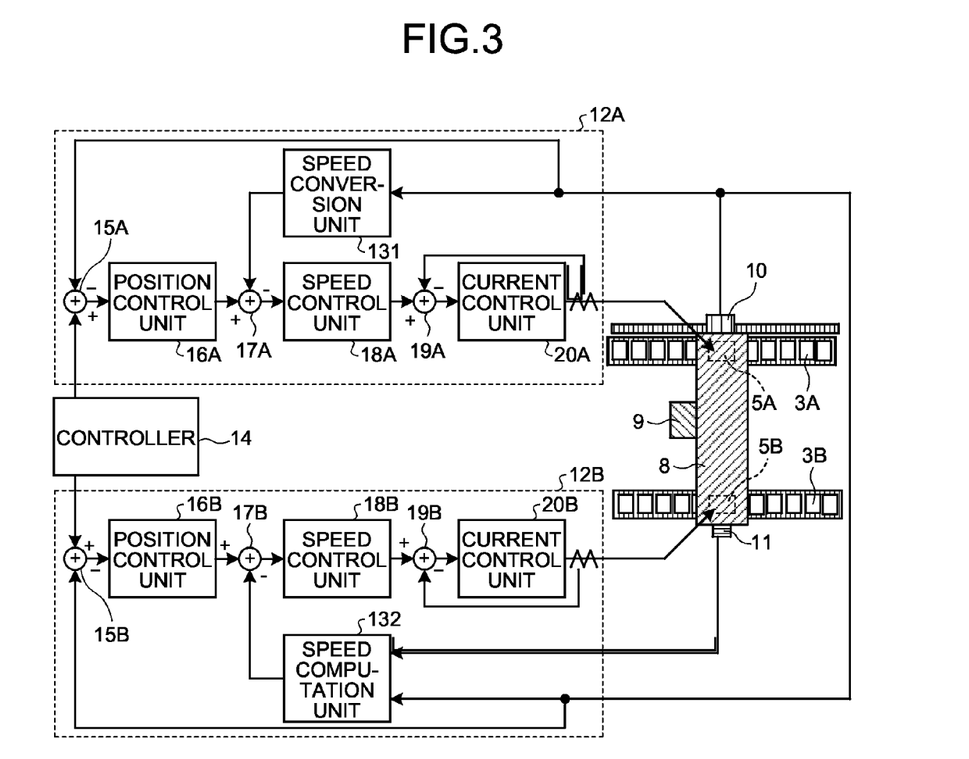
FIG. 3 is a block diagram showing functional blocks of the parallel drive system according to the first embodiment of the present invention.
Figure 4:
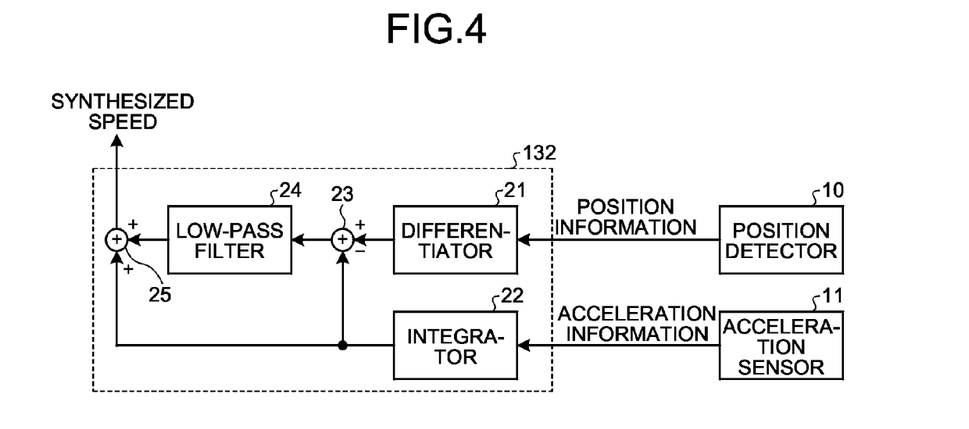
FIG. 4 is a block diagram showing a configuration of a speed computation unit 132 shown in FIG. 3.

Operations performed by the parallel drive system according to the first embodiment is explained next with reference to the drawings. FIG. 3 is a block diagram showing functional blocks of the parallel drive system 1 according to the first embodiment. FIG. 4 is a block diagram showing a configuration of a speed computation unit 132 shown in FIG. 3. An operation performed by the master servo amplifier 12A is explained first.

With reference to FIG. 3, a position instruction is inputted to the master servo amplifier 12A from the controller 14, and position information that represents an actual position of the movable unit 5A is also inputted to the master servo amplifier 12A from the position detector 10. In an adder 15A, the position information is subtracted from the position instruction and the subtraction result that is a position deviation is inputted to a position control unit 16A. From the position control unit 16A, a speed instruction according to the magnitude of the position deviation is outputted so as to make the position deviation to be zero.

The position information inputted from the position detector 10 is also inputted to a speed conversion unit 131. The speed conversion unit 131 differentiates the position information so as to convert the position information into an actual speed, and outputs the actual speed. Specifically, the speed conversion unit 131 calculates the actual speed based on a difference in position information for a predetermined time interval. The outputted actual speed is inputted to an adder 17A, and subtracted from the speed instruction, and the subtraction result that is a speed deviation is inputted to a speed control unit 18A. From the speed control unit 18A, a torque instruction according to the speed deviation is outputted so as to make the speed deviation to be zero. The torque instruction is inputted to an adder 19A, and an actual current outputted from a current control unit 20A is subtracted from the torque instruction, and a current deviation is inputted to the current control unit 20A. The current control unit 20A controls the actual current based on the current deviation, thereby controlling a torque of the master servomotor 2A.

An operation performed by the slave servo amplifier 12B is explained next. As for the operation performed by the slave servo amplifier 12B, constituent elements of the slave servo amplifier 125 that relate to the same operation as that performed by the master servo amplifier 12A are denoted by corresponding signs and their explanations will be omitted. As for the operation performed by the slave servo amplifier 125, the speed computation unit 132 has an operation different from that of the master servo amplifier 12A. Not only the position information inputted from the position detector 10 but also the acceleration information obtained by the acceleration sensor 11 provided in the slave movable unit 5B are inputted to the speed computation unit 132. The speed computation unit 132 outputs a synthesized speed based on speed information on the movable units.

With reference to FIG. 4, an operation performed by the speed computation unit 132 is explained next. In FIG. 4, a differentiator 21 that is a first speed conversion unit differentiates the position information inputted to the speed computation unit 132, and calculates a master side actual speed. On the other hand, an integrator 22 that is a second speed conversion unit integrates the acceleration information inputted from the acceleration sensor 11, so as to calculate a slave side actual speed. The calculated master side and slave side actual speeds are inputted to a speed synthesizer that is configured to include an adder 23, a low-pass filter 24, and an adder 25.

First, the adder 23 that is a subtraction unit subtracts the slave side actual speed from the master side actual speed, and inputs a difference between these actual speeds, that is, an actual speed difference to the low-pass filter 24. The low-pass filter 24 attenuates a frequency component higher than a cutoff frequency fcl in the actual speed difference. The adder 25 that is an addition unit adds an output from the low-pass filter 24 to the slave side actual speed that is an output from the integrator 22. An addition result is outputted from the speed computation unit 132 as a synthesized speed.

In order to improve performances such as high-speed positioning and highly-accurate constant-speed feeding of the arm member 8, it is necessary to improve follow-up performance to follow the position instruction from the controller 14 and boost response to disturbance by increasing a control gain of each of the controllers. If the control gain is increased, then a control band expands, and as a result a resonance frequency that is a mechanically inherent value for the arm member 8 falls within the control band.

When the resonance frequency of the arm member 8 falls within the control band, a difference between the master side actual speed calculated from the position information obtained from the position detector 10 and the actual speed of the slave movable unit increases because of an influence of resonance of the arm member 8. At this time, if a speed control loop of the slave servo amplifier 12B is constituted using the master side actual speed as a reference, then the control of the slave servo amplifier 12B is made to be unstable due to the increased difference in actual speed, thereby making it difficult to increase the control gain. As a result, the positioning time increases, which makes it impossible to achieve high-speed positioning.

On the other hand, even if resonance occurs in the arm member 8, the speed information calculated by converting the acceleration information obtained by the acceleration sensor 11 matches the actual speed of the slave servomotor movable unit 5B. Therefore, stable control can be expected as long as the speed control loop of the slave servo amplifier 12B is constituted based on this speed information. That is, it is possible to suppress increase in the positioning time that is caused by decrease in the control gain.

In order to perform the high-speed positioning, it is necessary to control the slave servo amplifier 12B based on speed information calculated from acceleration information obtained by the acceleration sensor 11, instead of the master side actual speed calculated from the position information obtained by the position detector 10 as described above. However, in the actual system, it is necessary to consider the probability that low-frequency error components such as offset are mixed into the output of the acceleration sensor 11. If the low-frequency error components are mixed into it, then an output of the speed computation unit 132 is reacted to the error components, resulting in an unnecessary torque instruction being generated. A difference between the speed information calculated form the position information obtained by the position detector 10 and the speed information calculated from the acceleration information obtained by the acceleration sensor 11 is small when the speed control loop of the slave servo amplifier 12B is constituted in a sufficiently lower control band than the resonance frequency of the arm member 8. For this reason, even if the speed control loop is constituted using the speed information that is calculated from the position information obtained by the position detector 10 as a reference, the control over the slave servo amplifier 12B can not become unstable.

Therefore, it is considered to provide a system in which the speed control loop of the slave servo amplifier 12B operates based on the speed information obtained from the position detector 10 in a low frequency region but operates based on the speed information obtained from the acceleration sensor 11 in a high frequency region. By this means, it is possible to build a system whereby high-speed positioning and high stability can be realized. In the first embodiment, this realization is easily achieved by the use of the low-pass filter 24.

An operation performed in this case is explained below. First, as attention is paid to the speed information from the differentiator 21, the low-pass filter 24 attenuates the components of the frequencies of the speed information equal to or higher than the frequency fcl. Accordingly, only the components of the frequencies equal to or lower than the frequency fcl are reflected in the synthesized speed that is the output. Next, as attention is paid to the speed information from the integrator 22, the output from the integrator 22 is given a minus sign, and thereupon passed through the low-pass filter 24, and inputted to the adder 25. On the other hand, the output from the integrator 22 is also separately inputted to the adder 25, so that the components of the frequencies equal to or lower than the frequency fcl are cancelled in the output of the adder 25. Accordingly, only the components of the frequencies of the speed information from the integrator 22 equal to or higher than the frequency fcl are reflected in the synthesized speed that is the output. That is, the synthesized speed is obtained based on the speed information from the differentiator 21, that is, the speed information obtained from the position detector 10 in a frequency band equal to or lower than the frequency fcl, whereas the synthesized speed is obtained based on the speed information from the integrator 22, that is, the speed information obtained form the acceleration sensor 11 in a frequency band equal to or higher than the frequency fcl.

As described above, the slave servo amplifier 12B can be stably controlled in a wide band and the system that can position the arm member 8 at a high speed can be established by setting the frequency fcl in a range shown below.

(Frequency at which low frequency errors in the output from the acceleration sensor 11 can be removed)<fcl<(frequency at which control over the slave servo amplifier 12 does not become unstable or resonance frequency of the arm member 8)   Inequality (1)

Figure 5:
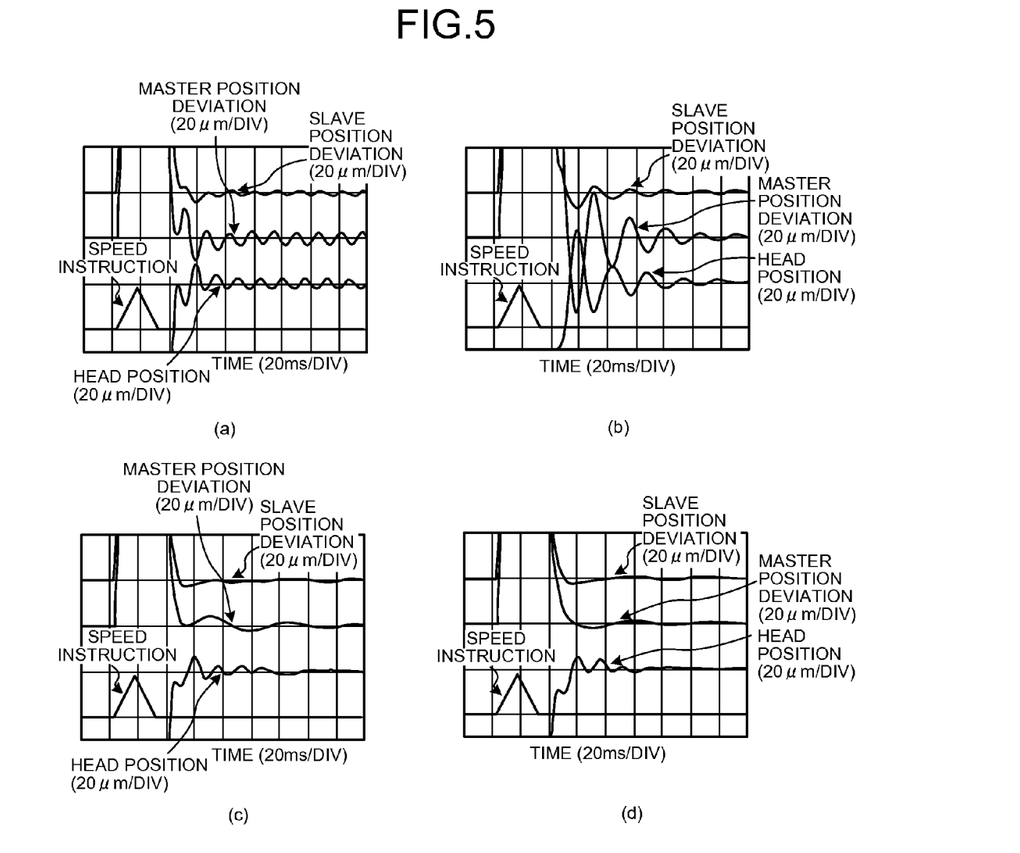
FIG. 5 depicts computer simulation results indicating a resonance suppression effect in the first embodiment of the present invention.

Simulation models were created so as to quantitatively confirm an effect of suppressing the resonance of the arm member 8 according to the present invention, and computer simulations were conducted in a case of positioning the arm member 8 at a high speed. FIGS. 5(a) to 5(d) depict calculation results. In the figures, there are shown behaviors of the speed instruction, the position deviations ([instructed position]−[actual position]) of the master and slave servo amplifiers 12A and 12B, and a position of the head 9, respectively. In the figures, a horizontal axis represents a time. FIGS. 5(a) and 5(b) depict calculation results of a conventional parallel drive system that is not equipped with the acceleration sensor 11 on the slave side. The figure (a) shows a case where the head 9 is located on the master side, whereas the figure (b) shows a case where the head 9 is located on the slave side. Even with the passage of time of about 100 microseconds after the speed instruction has been given, the position deviation and the position of the head 9 vibrate.

On the other hand, FIGS. 5(c) and 5(d) depict the calculation results of the parallel drive system according to the present embodiment. The figure (c) depicts a case where the head 9 is located on the master side, whereas the figure (d) depicts a case where the head 9 is located on the slave side. As compared with the FIGS. 5(a) and 5(b), it is understood that the vibration of the head 9 and the vibration of the position deviation for each of the master and slave sides are both small, as well as attenuation is fast, and the vibrations converge in about 100 microseconds in the present embodiment.

As described above, according to the first embodiment, the parallel drive system is configured so that the slave servomotor 2B does not have a position detector. Therefore, it is possible to advantageously establish the system at a low cost. Furthermore, the parallel drive system is configured to fetch the position information obtained by the position detector 10 of the master servomotor 2A into both the master and slave servo amplifiers 12A and 12B. Therefore, it is possible to advantageously control a position of the slave servomotor 2B. In addition, the parallel drive system is configured such that the movable unit 5B of the slave servomotor 2B has the acceleration sensor 11, and the slave servo amplifier 12B converts the detected acceleration information into a speed to compare the resultant speed with a value obtained by converting the position information on the master sided into a speed. Therefore, it is possible to advantageously grasp a vibration state of the arm member 8 as the speed information. Besides, the parallel drive system is configured such that the slave servo amplifier 12B has the speed computation unit 132 that synthesizes the calculated speed information on the master movable unit 5A and the calculated speed information on the slave movable unit 5B into the slave side speed information. Therefore, it is possible to stably control the slave servo amplifier 12B, and to position the arm member 8 at a high speed.

Figure 6:
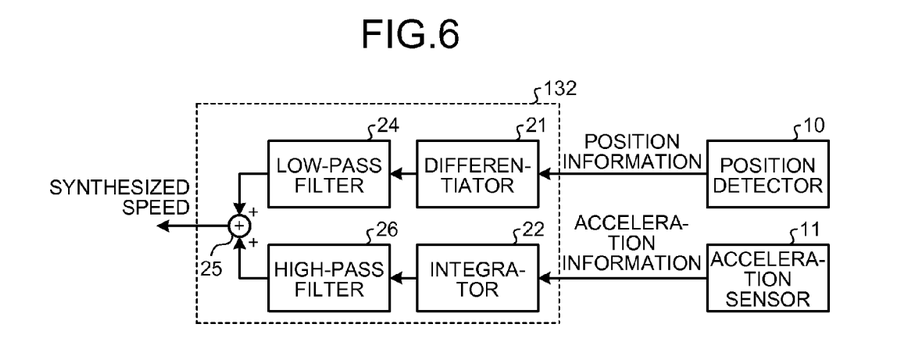
FIG. 6 is a block diagram showing another configuration of the speed computation unit 132 shown in FIG. 3.

While the configuration of the speed computation unit 132 has been explained while referring to FIG. 4 in the first embodiment, the configuration of the speed computation unit 132 is not limited to that shown in FIG. 4. For example, the speed computation unit 132 can be configured as shown in FIG. 6 as another configuration of the speed computation unit 132. In FIG. 6, a function of causing the differentiator 21 and the integrator 22 to convert the position information and the acceleration information into the master side actual speed and the slave side actual speed, respectively, is the same as that shown in FIG. 4. The calculated master side actual speed is inputted to the low-pass filter 24, whereas the slave side actual speed is inputted to a high-pass filter 26.

With reference to FIG. 6, the operation performed by the speed computation unit 132 is explained next. The low-pass filter 24 attenuates the components of the frequencies higher than the cutoff frequency fcl similarly to the configuration shown in FIG. 4. On the other hand, the high-pass filter 26 attenuates components of frequencies lower than a cutoff frequency fch. The adder 25 adds up outputs from the low-pass filter 24 and the high-pass filter 26, and the speed computation unit 132 outputs an addition result as the synthesized speed.

A case of the configuration shown in FIG. 6 is based on setting of the cutoff frequency fcl of the low-pass filter 24 and the cutoff frequency fch of the high-pass filter 26 to fall within a range in which the slave servo amplifier 12B can be stably controlled, for example, to a value lower than the resonance frequency of the arm member 8 and at the same time to hold fcl=fch. In this case, the output from the high-pass filter 26 is limited to information of the frequencies equal to or higher than the frequency band fch of the speed information obtained from the integrator 22, and conversely, the output from the low-pass filter 24 is limited to information of the frequencies equal to or lower than the frequency band fcl of the speed information obtained from the differentiator 21. That is, there is exerted an effect that the speed information used as a reference for the synthesized speed switches from the information from the differentiator 21 to the information from the integrator 22 at the set cutoff frequency.

As described above, by setting fcl and fch in a concept equivalent to that in the configuration shown in FIG. 4, equivalent effects can be obtained. This setting makes it possible to stably control the slave servo amplifier 12B and to position the arm member 8 at a high speed.

In the first embodiment, the position control unit 16A and the speed control unit 18A have been described as an example in which they output the speed instruction and the torque instruction so as to make the position deviation and the speed deviation to be zero, respectively. However, control to make the respective deviations become zero does not necessarily have to be always executed. For example, the configuration can be made to stop the control once the position deviation and the speed deviation are equal to or smaller than predetermined values sufficiently small, close to zero, respectively, thereby, needless to mention, making it possible to attain the same effects as in the present invention.

Second Embodiment

In the first embodiment, description is given for the case where the position instruction inputted from the controller 14 is inputted to both the master and slave servo amplifiers 12A and 12B, and the master and slave sides execute position control, respectively. However, it is not always necessary for the slave servo amplifier 12B to execute the position control based on the position instruction from the controller 14. As shown in a conventional parallel drive system shown in FIG. 9(a), for example, the slave servo amplifier 12B may execute torque control using a torque instruction outputted from the master servo amplifier 12A. In the second embodiment, description is given for the case where the slave servo amplifier 12B uses the torque instruction from the master servo amplifier 12A by way of example.

Figure 7:
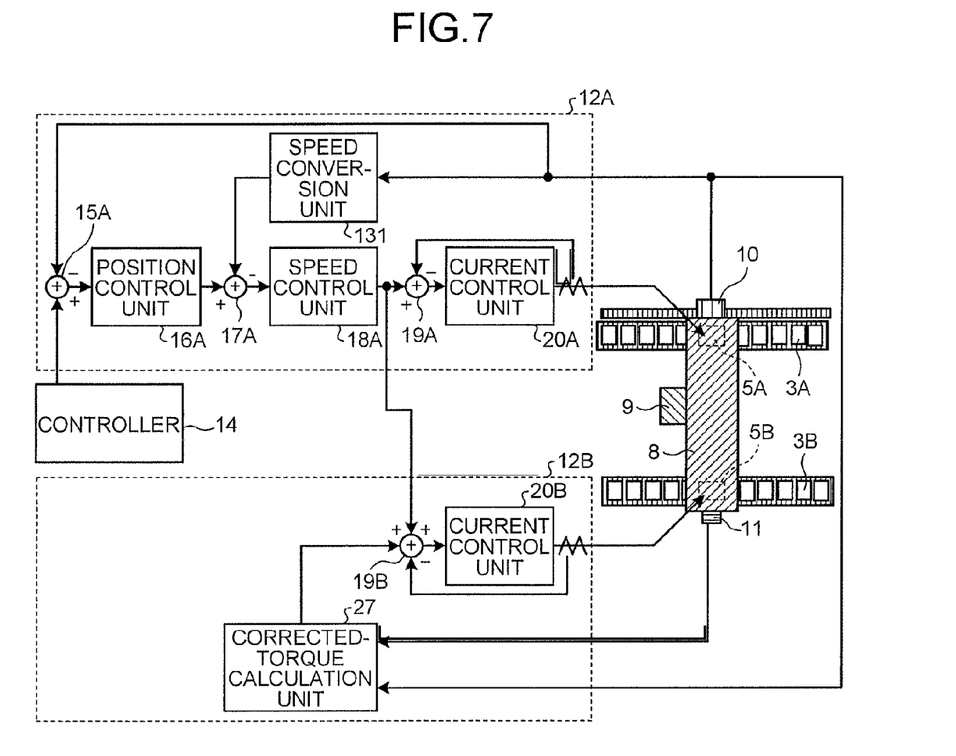
FIG. 7 is a block diagram showing functional blocks of a parallel drive system according to a second embodiment of the present invention.

FIG. 7 is a block diagram showing functional blocks of the parallel drive system according to the second embodiment. In FIG. 7, constituent elements identical to those in FIG. 3 are denoted by corresponding reference signs and explanations thereof will be omitted. In the second embodiment, the position instruction from the controller 14 is not inputted to the slave servo amplifier 12B. The torque instruction that is a control signal that is an output from the speed control unit 18A is inputted from the master servo amplifier 12A to the slave servo amplifier 12B.

Meanwhile, the position information on the master servomotor movable unit 5A from the position detector 10 and the acceleration information from the acceleration sensor 11 are inputted to the slave servo amplifier 12B, similarly to the first embodiment. These sorts of information are inputted to a corrected-torque calculation unit 27 that is a torque calculation unit, and therein a corrected torque is calculated.

Figure 8:
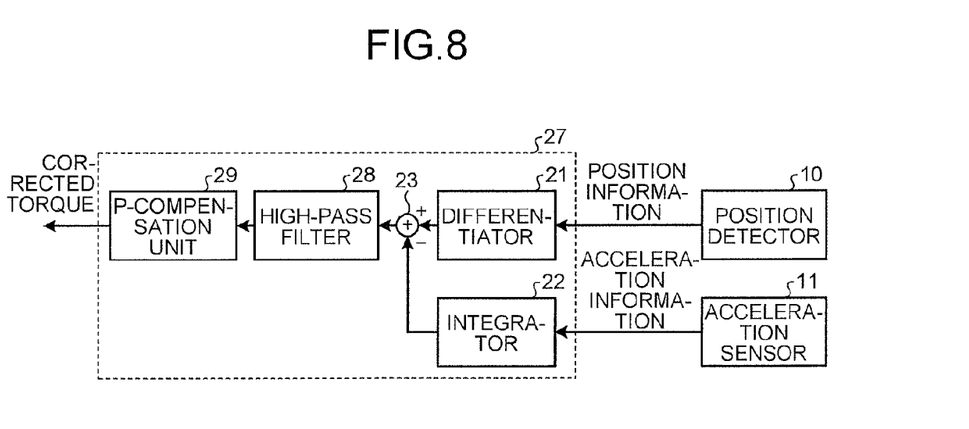
FIG. 8 is a block diagram showing a configuration of a corrected-torque calculation unit 27 shown in FIG. 7.

FIG. 8 is a block diagram showing functional blocks of the corrected-torque calculation unit 27 shown in FIG. 7. In FIG. 8, constituent elements identical to those in FIG. 4 are denoted by corresponding reference signs and explanations thereof will be omitted. The position information and acceleration information inputted to the corrected-torque calculation unit 27 are converted into a master side actual speed and a slave side actual speed, respectively. Then, the adder 23 calculates a difference between these speeds, that is, an actual speed difference, and inputs the actual speed difference to a high-pass filter 28. The high-pass filter 28 attenuates components of frequencies lower than the cutoff frequency fch. An output from the high-pass filter 28 is inputted to a P-compensation unit 29, and therein multiplied by a predetermined gain, thereafter resulting in the multiplication result being outputted as a corrected torque. An adder 19B adds the corrected torque to the torque instruction inputted from the master servo amplifier 12A, subtracts the actual current supplied to the slave servomotor 2B, from the addition result, and inputs the resultant current deviation to the current control unit 20B.

An operation performed by the corrected-torque calculation unit 27 is explained next. First, the description is given while referring to the conventional parallel drive system shown in FIG. 9(a). The slave servo amplifier 12B executes the torque control using the torque instruction inputted from the master servo amplifier 12A. Accordingly, depending on changes in the position of the center of gravity of the arm member 8 and in the position of the head 9, not only the accuracy of the parallel displacement of the arm member 8 degrades at the time of driving and the mechanical load on the arm member 8 increases, but also it is difficult to position the arm member 8 at a high speed with high accuracy. If the resonance frequency of the arm member 8 falls within the control band, then a difference between the master side speed information calculated from the position information obtained from the position detector 10 and the slave side actual speed for the movable unit increases due to the influence of the resonance of the arm member 8. In contrast to this, in the parallel drive system shown in the second embodiment, the actual speed difference that is the difference between these pieces of speed information is obtained by the adder 23, and the corrected torque is outputted so that this actual speed difference is minimized.

An operation performed by the high-pass filter 28 is explained. The low-frequency error components such as offset may be mixed into the output from the acceleration sensor 11. It is necessary to prevent this mixture from causing the slave-side corrected torque to diverge. The high-pass filter 28 is provided to take measures against this divergence, and the corrected torque is not outputted for the low-frequency error components. This makes it possible to stably output a corrected torque such that a speed into which the position information obtained by the position detector 10 is converted is synchronized with a speed into which the acceleration information obtained from the acceleration sensor 11 is converted. As a result, the accuracy of the parallel displacement of the arm member 8 improves and the arm member can be positioned at a high speed with high accuracy. At a time of implementing actual computation of the corrected-torque calculation unit 27, equivalent computation in which subtraction operation in the integrator 22 and the adder 23 and the high-pass filter 28 are combined so as to prevent intermediate variables for the operation, such as the output from the integrator 22 from becoming infinite values even when the errors are present in the acceleration sensor 11.

As described above, according to the second embodiment, the slave servo amplifier 12B includes the corrected-torque calculation unit 27 that calculates the corrected torque from the calculated speed information on the master and slave servomotor movable units 5A and 5B. Therefore, it is advantageously possible to parallelly displace the arm member 8 with high accuracy, and to position the arm member at a high speed with high accuracy.

In the present embodiment, the head 9 is fixed to the arm member 8. That is, description is given for the case where a moving direction of the head 9 is only the direction of driving the arm member 8. However, it is not always necessary to fix the head 9 to the arm member 8. For example, the actuators that can drive the head 9 in a direction orthogonal to the direction of driving the arm member 8 can be configured so as to be able to position the head 9 on an X-Y axis. With this configuration, it is possible to achieve the effects of the present invention and to position the head 9 on the X-Y axis.

In the present embodiment, the parallel drive system has been explained as a servo system in which linear servomotors constitute actuators that include linearly-moving movable units that are arranged in parallel, respectively. However, the present invention is not limited thereto. For example, a drive system may be configured by a combination of a rotating motor and a ball screw or the like, and effects equivalent to those of the present invention can be achieved as long as movable units are configured to linearly move in parallel.

INDUSTRIAL APPLICABILITY

The present invention is applicable to an arm-positioning control device and an arm constant-speed feeding control device in a parallel drive system in which an arm member connects linearly-moving servo actuators arranged in parallel to each other in a technical field such as machine tools.

REFERENCE SIGNS LIST

1 PARALLEL DRIVE SYSTEM
2 SERVOMOTOR
3 SERVOMOTOR FIXING UNIT
4 LINEAR GUIDE
5 SERVOMOTOR MOVABLE UNIT
6 TABLE MEMBER
7 ARM SUPPORT MEMBER
8 ARM MEMBER
9 HEAD
10 POSITION DETECTOR
11 ACCELERATION SENSOR
12 SERVO AMPLIFIER
131 SPEED CONVERSION UNIT
132 SPEED COMPUTATION UNIT
14 CONTROLLER
15, 17, 19, 23, 25 ADDER
16 POSITION CONTROL UNIT
18 SPEED CONTROL UNIT
20 CURRENT CONTROL UNIT
21 DIFFERENTIATOR
22 INTEGRATOR
24 LOW-PASS FILTER
26, 28 HIGH-PASS FILTER
27 CORRECTED-TORQUE CALCULATION UNIT
29 P-COMPENSATION UNIT

The invention claimed is:

1. A parallel drive system comprising:
a first actuator and a second actuator that include linearly-moving movable units that are arranged in parallel to each other, respectively; and
an arm member that forms a bridge between the movable unit of the first actuator and the movable unit of the second actuator, wherein the parallel drive system further comprises:
a position detection unit that detects position information on the movable unit of the first actuator;
an acceleration detection unit that detects acceleration information on the movable unit of the second actuator;
a first control unit that controls the first actuator based on the position information; and
a second control unit that controls the second actuator based on the position information and the acceleration information, wherein the second control unit includes:
a first speed conversion unit that converts the position information into first speed information,
a second speed conversion unit that converts the acceleration information into second speed information, and
a speed synthesizer that synthesizes the first speed information and the second speed information into a synthesized speed.

2. The parallel drive system according to claim 1, wherein the first and second actuators are linear servomotors, the first and second control units are servo amplifiers, and the position detection unit is a linear scale.

3. The parallel drive system according to claim 1, wherein the speed synthesizer includes:
a subtraction unit that subtracts the second speed information from the first speed information;
a low-pass filter that has a predetermined cutoff frequency, and receives an output from the subtraction unit; and
an addition unit that adds an output from the low-pass filter to the second speed information to generate the synthesized speed.

4. The parallel drive system according to claim 1, wherein the speed synthesizer includes:
a low-pass filter that has a predetermined cutoff frequency, and receives the first speed information;
a high-pass filter that has a predetermined cutoff frequency, and receives the second speed information; and
an addition unit that adds an output from the low-pass filter to an output from the high-pass filter to generate the synthesized speed.

5. A parallel drive system comprising:
a first actuator and a second actuator that include linearly-moving movable units that are arranged in parallel to each other, respectively; and
an arm member that forms a bridge between the movable unit of the first actuator and the moveable unit of the second actuator, wherein
the parallel drive system further comprises:
a position detection unit that detects position information on the moveable unit of the first actuator;
an acceleration detection unit that detects acceleration information on the movable unit of the second actuator;
a first control unit that controls the first actuator based on the position information; and
a second control unit that controls the second actuator based on the position information and the acceleration information, and wherein
the second control unit is configured to:
further receive a control signal for controlling a torque of the first actuator from the first control unit;
have a torque calculation unit that calculates a corrected torque based on the position information and the acceleration information; and
control the second actuator based on an output from the torque calculation unit and the control signal.

* * * * *